3,814,783
METHOD FOR MANUFACTURING STERILE CONTAINERS

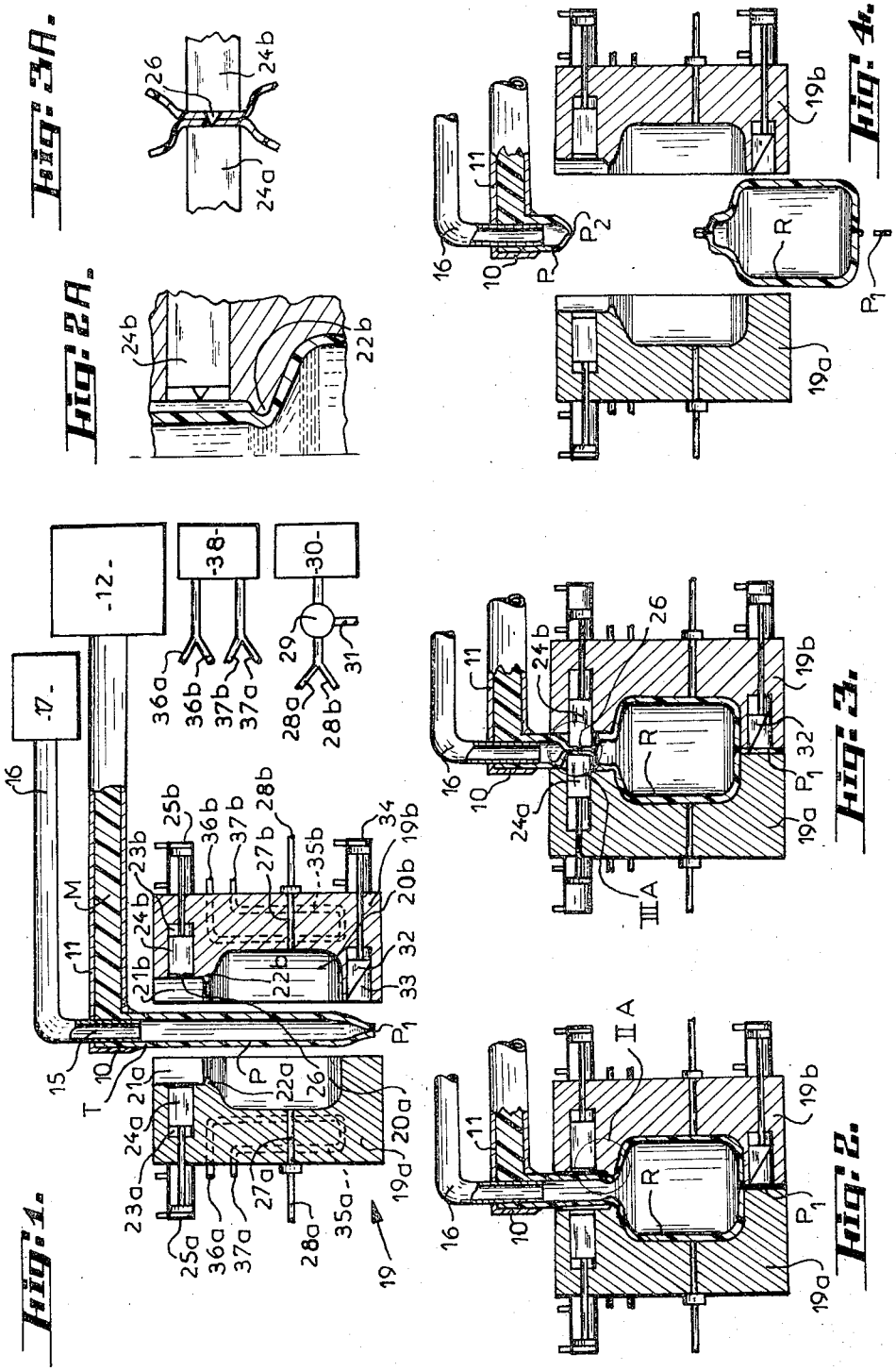

Edgar Dardaine, Sorel-Moussel, and Jean-Luc Berry, Mesnil-sur-l'Estree, France, assignors to E. P. Remy, et Cie, Dreux, France
Filed Feb. 2, 1972, Ser. No. 222,896
Claims priority, application France, Feb. 12, 1971, 7104787
Int. Cl. B29c 17/07
U.S. Cl. 264—89      7 Claims

ABSTRACT OF THE DISCLOSURE

Method of manufacturing sealingly closed plastic containers. An extruded parison is maintained with its interior in communication with a source of sterile gas under a constant pressure slightly higher than atmospheric. A vacuum is created in the region of a mold surrounding the parison while the parison remains in permanent communication with the source of sterile gas under pressure, the vacuum shaping the parison against the mold. The top of the formed container is sealed and the container is discharged from the mold.

---

The present invention has essentially for its object a method of manufacturing sealingly closed containers, according to which a heat-weldable plastic material is extruded in the form of a continuous tube, a certain length of the said tube, sufficient for making a container, is confined in a mold formed of separable parts or boxes, and this tube portion, or parison, is swollen within the mold to form the said container.

In the presently known methods of this type, the tubular parison delivered by the extrusion die is first separated and then swollen by introducing a sterile compressed gas, for instance air. In the case of a parison, one end of which remains open after the closing of the mould to subsequently form the container neck, the said gas is introduced by means of an adjutage or a mandrel which penetrates into the said open end, whereas in the case of a parison which is completely closed during the closing of the mold, the said gas is introduced by means of a needle which is passed through the said parison.

The drawback of the known methods just described is that they do not eliminate the risk of pollution of the interior of the containers subsequent to extrusion. Indeed, in the first case, the parison communicates with the ambient air between the moment it is separated from the rest of the tube (i.e. from the following parison) and the moment it receives the sterile compressed air or gas, so that it incurs the risk of being contaminated. In the second case, the parison is liable to contamination by the needle passing therethrough.

Another drawback of the first said method is that the container must be closed after being swollen; during this closing operation the compressed gas or air used for the swelling escapes in a practically uncontrollable manner, thus rendering impossible the setting up of a final pressure of a given value within the closed container. Now the shape of the container depends upon the value of this internal pressure. Internal-pressure differences between the various containers lead to correlative variations in the shape of the containers and are therefore detrimental to the uniformity of the final product.

The purpose of the method according to the present invention is to avoid the aforementioned drawbacks, the said method being characterized in that it consists in maintaining the interior of the parison, sealingly closed at its lower end, in communication with a source of sterile gas under a constant pressure slightly higher than atmospheric, and closing the mold so as to confine the parison between the mold parts or boxes, in creating a vacuum inside the mold and outside the parison so as to swell the latter and form the container, the parison remaining, during these closing and swelling operations, in permanent communication with the source of gas under pressure, in sealingly closing the upper portion of the container and the lower portion of the following parison, in separating the said container from the said following parison, and then in opening the mould and discharging the container from the said mold.

It is thus understood that in the method according to the invention the interior of the parison does never communicate with the ambient atmosphere, since the parison having served to form a container is not separated from the rest of the tube until the container is completely finished and therefore sealingly closed, this closing of the container causing at the same time the closing of the lower end of the rest of the tube, i.e. of the parison intended to form the following container. The method according to the invention eliminates any risk of pollution of the interior of the container subsequent to extrusion, thus enabling internally sterile containers to be obtained.

Furthermore, since the parison and then container are in permanent communication with a source of gas under constant pressure, the closing of the container is performed while the latter is in pressure equilibrium with the said source, thus enabling containers with a readily controllable and uniform internal pressure to be obtained, i.e. containers whose shape is much more uniform than that of the containers obtained by the previously known method, wherein the closing of a container is performed simultaneously with the discharge of the blowing gases.

Owing to the fact that the invention eliminates the sterile blowing-gas losses occurring during the closing of the containers in the known methods, it leads to considerable economy in sterile-gas consumption, thus enabling a readily sterilizable inert-gas such as nitrogen to be used.

The forming of a container by means of external vacuum instead of internal blowing prevents the ambient air from passing into the sterile-gas circuit in case of accidental leakage from a container.

According to another feature of the invention, the communication between the interior of the parison and the said sterile-gas source is provided at the location where the extrusion of the plastic material takes place, the said gas arriving concentrically to the said plastic material.

The introduction of sterile gas into the parison takes place without there being any need of passing through the latter any implement capable of contaminating it.

According to another feature of the invention the parison is cooled within the mold simultaneously with the forming of the container, except for the parison portion forming the upper portion of the said container and intended to be sealingly closed.

Owing to the fact that the parison is not cooled at the location where the closing is to be performed, enables its welding properties to be preserved.

The invention is also directed at a device for carrying out the aforesaid method, the said device being characterized in that it comprises at least one extrusion die provided with a central channel connected with a source of sterile gas under a constant pressure slightly higher than atmospheric, and at least one mold formed of at least two juxtaposable parts or boxes adapted to receive between them the tube portion extruded by the said die and forming the said parison, the said parts or boxes being provided at their upper portion with notches or grooves allowing free passage of said parison after the closing of the mold.

Owing to this configuration of the die, the sterile gas is introduced into the extruded tube, i.e. into each parison, as soon as the latter is formed, without there being any need to subsequently pass an implement therethrough.

Furthermore, the configuration of the mold parts enables the parison located in the mold to be maintained in permanent communication with the sterile-gas source during the forming of the container.

In the appended drawings given solely by way of example:

FIG. 1 is a diagrammatic view showing a device for the carrying out of the method of the invention, the said device being shown during the extrusion of the plastic material, prior to the closing of the mold;

FIG. 2 is a partial view of the said device after the closing of the mold and the forming of the container by way of swelling;

FIG. 2a is a view, to a larger scale, of the encircled portion of FIG. 2;

FIG. 3 illustrates the nipping and cutting of the parison at the upper portion of the container;

FIG. 3a is a view, to a larger scale, of the encircled portion of FIG. 3;

FIG. 4 illustrates the discharge of the container and its tail waste from the mold.

According to the form of embodiment illustrated, a device according to the invention comprises essentially a circular-section die 10 connected through the medium of a pipe 11 to an extruder shown diagrammatically at 12. A molten plastic material M such as polyethylene is supplied by the extruder, for instance by means of a helical screw (not shown), to the die 10 through the medium of the pipe 11.

The die 10 is internally provided with a central channel 15, the cross-sectional configuration of which is circular and concentric with the said die. The channel 15 is connected through a pipe 16 to a source of sterile gas under constant pressure, shown diagrammatically at 17. The gas supplied by the source 17 may advantageously be a previously sterilized inert gas such as nitrogen, maintained under a pressure slightly higher than atmospheric, for instance from 0.04 to 0.06 atmosphere approximately.

The plastic material is extruded through the die 10 in the form of a continuous tube T surrounding the channel 15, the said tube forming the successive parisons P, each of which will serve to form a container.

The device according to the invention also comprises a mold 19 arranged below the die 10 and formed of two identical juxtaposable boxes or parts 19a and 19b. Each box 19a and 19b comprises a cavity 20a, 20b serving to form the body of a container and is provided at its upper portion, intended to form the neck of the container, with a notch or groove 21a and 21b communicating with their cavity 20a, 20b respectively, so that when the mold is closed a passageway for the tube extruded through the die 10 is formed. Each notch or groove 21a and 21b is provided at its lower portion with an inwardly protruding projection 22a and 22b respectively. When the mold is closed, the said projections form a constriction at the lower end of the passageway formed by the notches or grooves 21a, 21b. The function of this constriction will be explained later. Closing and severing jaws 24a and 24b are slidingly mounted in recesses 23a and 23b provided in each mold box 19a and 19b at the upper portion of the latter, i.e. in the region of the notches or grooves 21a and 21b. The jaws 24a, 24b are connected to actuating devices such as pnuematic actuators 25a and 25b. The jaw 24b is provided at its front end with a cutting edge 26.

Each mold box 19a, 19b is also provided with a channel 27a and 27b opening on the internal face of its cavity 20a, 20b respectively and adapted to be connected, through conduits 28a and 28b and by means of a switch 29, with either the vacuum source 30 or a vent pipe 31 communicating with the atmosphere.

The mold box 19b is provided at its lower portion with a tail-removing shear 32 mounted slidingly in a recess 33 and connected to an actuating device such as a pneumatic actuator 34.

Lastly, each mold box is provided with a cooling circuit 35a, 35b permanently connected to a cooling-fluid source 38 through conduits 36a, 36b, 37a, 37b.

The various operating stages of the device for carrying out the method of the invention are as follows.

(1) The open mold 19 being placed below the die 10, i.e. its two boxes 19a, 19b being separated from one another and arranged symmetrically with respect to the axis of the said die (see FIG. 1), the extruder 12 extrudes the plastic material M, which leaves the die in the form of a tube T. The reference letter P indicates the tube portion or parison which is intended to form a container and is closed at its lower portion P1 (this portion was closed during the making of the preceding container). The extrusion of the plastic material is stopped when the lower end P1 of the parison P is substantially at the level of the lower portion of the mold boxes. During the extrusion, the interior of the parison communicates permanently, through the medium of the channel 15 and the pipe 16, with the sterile-gas source 17 and is therefore subjected to a slight constant overpressure which, besides, is insufficient to perceptibly cause its swelling.

(2) The mold is closed by moving both mold boxes 19a and 19b towards one another until they are juxtaposed. The lower portion P1 of the parison P is nipped between the two lower faces of the mold boxes, whereas the upper portion of the parison passes practically without deformation through the passageway formed by the two notches 21a and 21b of the mold boxes; only the projections 22a, 22b come into contact with the said upper portion of the parison.

(3) The channels 27a and 27b are then connected to the vacuum source 30 through the medium of the switch 29. Owing to the presence of the projections 22a and 22b which are in contact with the parison when the mold is closed and prevent any communication between the cavities 20a, 20b (i.e. the mold portion corresponding to the container body) and the atmosphere, only the parison portion corresponding to the container body comes into contact with the walls of the cavities 20a and 20b, whereas the upper portion of the parison, located in the grooves 21a and 21b above the projections 22a and 22b, is not subjected to the action of vacuum and therefore does not come into contact with the mold. The mold being cooled by the cooling circuits in which a cooling fluid flows permanently, only the parison portions coming into contact with a cold wall of the mold are cooled. In other words, only the body of the container R is cooled, whereas the upper portion of its neck, which is located above the projections 22a and 22b, is neither subjected to the action of vacuum nor applied on the mold notches, and therefore is not cooled.

(4) The upper portion of the container is closed by moving the jaws 24a, 24b by means of the actuators 25a and 25b. The jaws first nip the uncooled portion of the parison and then cut it by means of the edge 26, so that the container and the lower portion P2 of the following parison are closed sealingly and separated from one another. Owing to the still existing temperature of the material, the pressure exerted by the jaws is sufficient to cause the welding of the parison.

(5) The container bottom is freed from its waste tail, i.e. the parison portion P1 nipped between the two lower portions of the mold boxes is cut by the shear member 32.

(6) The atmospheric pressure between the mould and the container is restored through the medium of the switch 29 and the channels 27a and 27b. The mold can then be opened and the container freed from its waste tail.

The extrudler is then operated again to extrude a further amount of plastic material and the above operations are repeated to make the following container.

Of course, the invention is by no means limited to the forms of embodiment described and illustrated, which have been given by way of example only. In particular, it comprises all the means constituting technical equivalents to the means described as well as their combinations, should the latter be carried out acording to the spirit of the invention.

What is claimed is:

1. Method of manufacturing sealingly closed plastic containers wherein a heat-weldable plastic material is extruded in the form of a continuous tube having an outermost end, comprising sealingly closing off said continuous tube at said outermost end, providing a cooled mold having separable parts that may be moved to open and closed positions, said mold parts in closed position defining a container-shaped space conforming to the desired shape of the containers and a neck-shaped space, said container-shaped space and said neck-shaped space being separated by a constricted zone, introducing into said mold while in the open condition of its parts, a determined length of the said tube as a tubular parison so that a first portion of said parison lies between the mold parts defining said container-shaped space and a second portion of said parison lies between the mold parts defining said neck-shaped space, while maintaining the outermost end of said determined tube length sealingly closed and in continuous communication with a source of sterile gas under a constant pressure slightly higher than atmospheric pressure but insufficient to perceptibly cause the swelling anywhere of said tube and parison, moving said mold parts to closed condition about said introduced parison so as to effect constriction of said parison in said constricted zone between its first and second portions and thereby provide a seal between said container-shaped space and said neck-shaped space, said first and second sections then remaining out of contact with said mold parts, continuing to introduce said sterile gas at said same constant pressure into said tube and parison, then creating a vacuum in said container-shaped space between said closed mold parts and externally of said first portion of said parison and thereby by said pressure effecting the swelling expansion in said container shaped space only of said first portion of said parison to conform and cool the latter into the shape of said container-shaped space, compressing a region of said second parison portion while uncooled to collapse abutment of its inner walls with simultaneous sealing closure of the top of said parison and also of the following oncoming continuous tube directly adjacent said top of said parison for forming a closed container and a closed outermost end of the following oncoming tube, thereafter severing said parison from said tube in said sealed compressed region so as to separate said shaped container in sealed condition from said tube and also maintain sealed close-off of the outermost end of said oncoming tube, and thereafter moving sid mold parts to open condition and removing said sealed and shaped container therefrom.

2. Method according to claim 1, wherein the communication between the interior of said tube length and said source of sterile gas takes place in the region where the plastic material is extruded, the said gas arriving concentrically to the said plastic material.

3. Method according to claim 1 wherein said first parison portion is cooled within said mold parts in closed condition simultaneously with the formation of said container from said first parison portion, while said second portion of said parison which is to be sealingly closed remains uncooled during formation of the container.

4. Method according to claim 3 wherein said mold is cooled only in the portion of said mold parts which define said container-shaped space whereat on swelling of said first portion of said parison the later comes into contact with said mold parts in their closed condition.

5. Method according to claim 1 wherein said vacuum is created only in the portion of said mold defining said container-shaped space.

6. Method according to claim 1 wherein said closure of said shaped container and of said outermost end of said oncoming continuous tube are effected simultaneously by said compressing of said region of said second parison portion which also effects a welding together of a portion of said plastic material in said region and wherein said severing of said shaped container from said continuous tube is effected in said last-named portion so that both said shaped container and said outermost end of said oncoming continuous tube remain sealed at the severance location.

7. Method of manufacturing internally sterile sealed containers of heat weldable plastic material comprising extruding said material in the form of a continuous tube, sealingly closing off said tube at its outermost end, providing a cooled mold that may be opened and closed, said mold in closed condition defining a space conforming to the desired shape of the container and a further neck-shaped space, said container-shaped space and said neck-shaped space being separated by a constricted zone, introducing into said mold while open a determined length of said tube as a tubular parison so that a first portion of said parison lies in said container-shaped space, and a second portion lies in said neck-shaped space, closing said mold to effect constriction of said parison in said zone between its first and second portions and thereby a seal between said container-shaped space and said neck-shaped space, said first and second portions remaining out of contact with said mold, continuously introducing sterile gas into said tube and said parison under a pressure from 0.04 to 0.06 above atmosphere which is insufficient to effect perceptible swelling of said tube and parison, then creating a vacuum in said container-shaped space externally of said first portion of said parison and thereby by said pressure of said gas effecting a swelling expansion in said container-shaped space only of said first portion of said parison to conform and cool the latter with the shape of said container-shaped space, then compressing a region of said second parison portion to collapsed sealing engagement of its inner walls, and thereafter severing said parison in said sealed compressed region so as to separate said shaped container in sealed condition from said tube and simultaneously close and seal off the end of the oncoming extruded tube and also severing a tailing from said shaped-container, and thereafter opening said mold and removing the sealed and shaped container therefrom.

References Cited
UNITED STATES PATENTS

| | | | |
|---|---|---|---|
| 3,423,495 | 1/1969 | Bachner | 264—96 |
| 3,493,641 | 2/1970 | Svendsen | 264—98 |
| 3,310,620 | 3/1967 | Martelli et al. | 264—99 X |
| 3,269,079 | 8/1966 | Schmied | 99—171 R UX |
| 3,358,062 | 12/1967 | Lemelson | 264—98 X |
| 2,991,500 | 7/1961 | Hagen | 264—96 X |

JAN H. SILBAUGH, Primary Examiner

U.S. Cl. X.R.

53—140; 264—90, 96, 98; 425—DIG. 207, DIG. 212